United States Patent
Miller

(10) Patent No.: US 6,438,512 B1
(45) Date of Patent: Aug. 20, 2002

(54) SYSTEM AND METHOD FOR PERFORMANCE MONITORING OF APPLICATION CODE

(75) Inventor: Jeffrey M. Miller, Oviedo, FL (US)

(73) Assignee: Convergys CMG Utah, Inc., South Jordan, UT (US)

( * ) Notice: Subject to any disclaimer, the term of this patent is extended or adjusted under 35 U.S.C. 154(b) by 0 days.

(21) Appl. No.: 09/406,354

(22) Filed: Sep. 28, 1999

(51) Int. Cl.[7] .............................................. G06F 11/34
(52) U.S. Cl. ...................................... 702/186; 717/127
(58) Field of Search ................................ 702/186, 182, 702/183; 712/202; 717/124, 125, 126, 127; 714/47, 39

(56) References Cited

U.S. PATENT DOCUMENTS

| | | | | |
|---|---|---|---|---|
| 5,062,055 A | * | 10/1991 | Chinnaswamy et al. | 702/182 |
| 5,790,117 A | | 8/1998 | Halviatti et al. | 345/333 |
| 5,796,633 A | | 8/1998 | Burgess et al. | 364/551.01 |
| 5,815,653 A | | 9/1998 | You et al. | 395/183.14 |
| 5,852,818 A | * | 12/1998 | Guay et al. | 707/1 |
| 6,067,412 A | * | 5/2000 | Blake et al. | 709/101 |
| 6,115,393 A | * | 9/2000 | Engel et al. | 370/469 |
| 6,126,328 A | * | 10/2000 | Mallory et al. | 717/114 |
| 6,189,142 B1 | * | 2/2001 | Johnston et al. | 345/765 |

OTHER PUBLICATIONS

Cockcroft, What's the Best Way to Probe Processes?, Sunworld (http://www.sunworld.com/swol-08-perf.html), Aug., 1999, 1-10 pp.

Lynch, UNIX and Web Performance, Manager System Services, Boston College, Session 133, UNIX Performance Management (http://www.circle4.com/jaqui/papers/webunuk.html), Aug., 1999, 1-11 pp.

Author Unknown, The Linux GCC HOWTO: Preliminaries, (http://www.linuxdoc.org/HOWTO/GCC-HOWTO-1.html), Sep., 1999, 1 p.

Author Unknown, Frequently Asked Questions for FreeBSD 2.X, Chapter 12. Miscellaneous Questions, (http://www-.freebsd.org/FAQ/misc.html), Sep., 1999, 1-6 pp.

Author Unknown, Linux Frequently Asked Questions, 8. Miscellaneous Information and Questions Answered (http://www.Linuxdoc.org/FAQ/Linux-FAQ-8.html), Sep., 1999, pp. 1-4.

Author Unknown, FreeBSD Handbook, Chapter 23, Linux Mode, How Does the Linux Mode Work?, (http://www-.freebsd.org/handbook/x20723.html), Sep., 1999, 1-2 pp.

Rose, UNIX Unleashed unx39.htm, Performance Monitoring, Aug., 1999, 1-41 pp.

* cited by examiner

Primary Examiner—Marc S. Hoff
Assistant Examiner—Edward Raymond
(74) Attorney, Agent, or Firm—Frost Brown Todd LLC

(57) ABSTRACT

A system and method for performance monitoring of application code is disclosed. The system and method may be used, without any preparation work, to actively measure a production application or an application under development. Accurate data regarding the system and user functions that comprise the application are presented in a report. The report information may be analyzed to determine application code bottlenecks. The information regarding the code bottlenecks may then be used by an application developer to modify the code to reduce or eliminate bottlenecks.

20 Claims, 2 Drawing Sheets

SYSTEM AND METHOD FOR PERFORMANCE MONITORING OF APPLICATION CODE

BACKGROUND OF THE INVENTION

1. Field of the Invention

Figure 1:
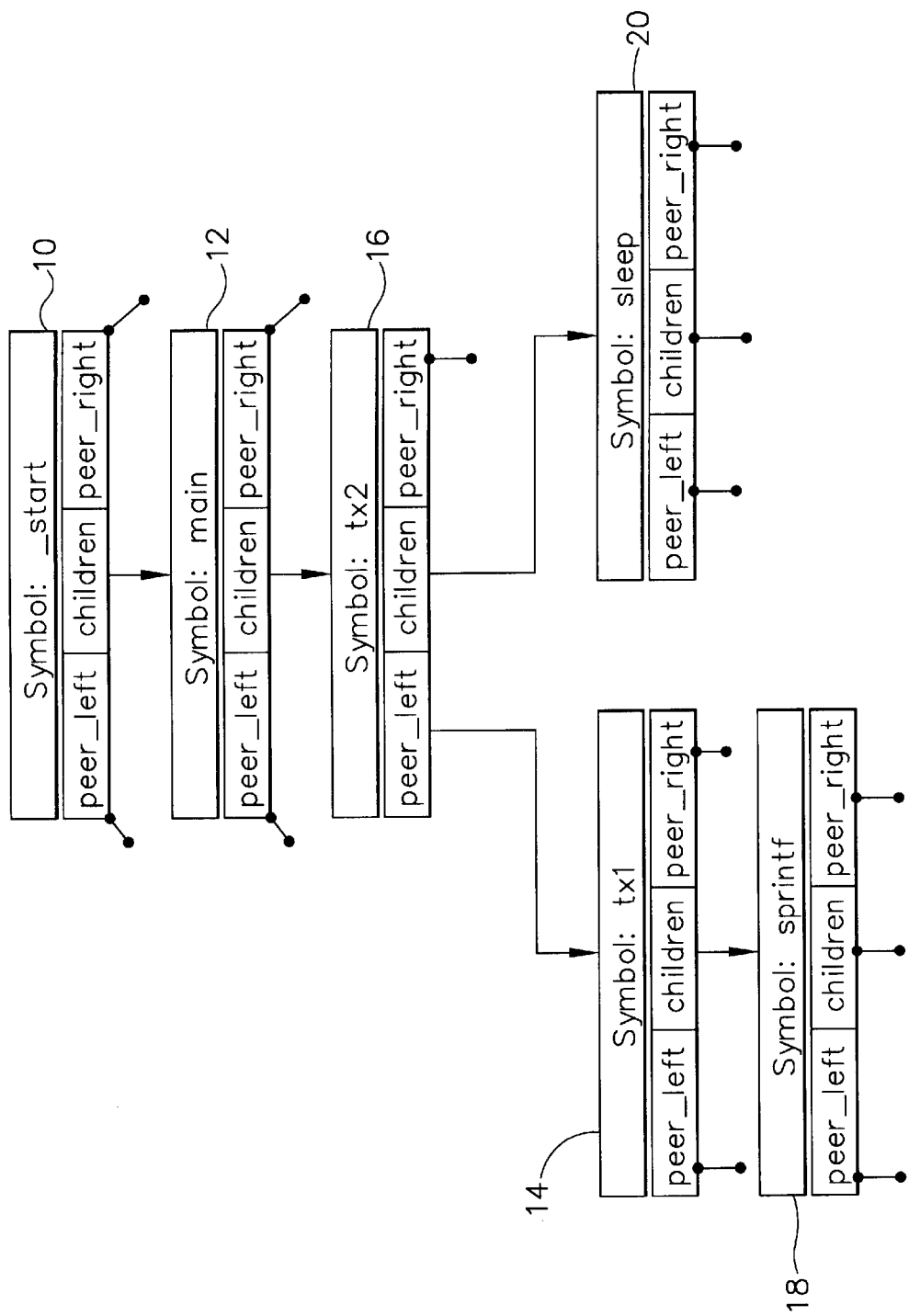

The present invention relates generally to computer system performance and tuning. More particularly, the present invention is a system and method for performance monitoring of application code to identify bottlenecks so that they may be reduced or eliminated.

2. Description of Related Art

For real time applications and most CPU intensive applications, performance is a key factor. Performance improvements for such applications provide two (2) major benefits. First, performance improvements allow the application to run faster. Secondly, performance improvements have an impact on the bottom line. If an application uses fewer CPU cycles, it completes more quickly so that the same processor may support executions of other portions of the application. As a result, fewer processors are required to execute the application. If fewer processors are required, fewer human resources are needed to operate a system.

In order to introduce performance improvements into an application, it is necessary to determine the performance bottlenecks. The most obvious (and most painful) way to determine the performance bottlenecks is to analyze the source code directly. An extremely skilled programmer can make fairly substantial gains with this mechanism. However, when the application consists of hundreds, thousands, or millions of lines of code, this solution simply isn't practical.

Some operating system software vendors provide performance monitoring utilities or tools with their operating system software. For example, Sun Microsystem's Solaris operating system provides a tool called prof to assist with application code performance monitoring. The prof tool provides performance information meaning it provides performance data at various points during execution of the application. The prof tool 'instruments' the object code directly. The prof tool steps through all of the object code and adds new lines of code to the application that allow it to collect performance data. So to monitor an application currently in production, a new application containing the prof data must be delivered. Under most situations, this solution is impractical and is not viable.

Other tools may be used to collect and report data, but they require substantial preparation to be used with an application. For example, the quantify tool developed and sold by Pure Software provides accurate data, but also requires a re-link of the application code. Due to the re-linking requirement, it is impossible to use the quantify tool to measure production application code.

Another tool that requires preparation is the dbx tool provided with many versions of the UNIX operating system. Dbx is a debugging tool that may be used to collect performance data. The performance data collected may be fairly accurate. However, dbx must be installed on the run-time environment. It works only with non-stripped executables and run time libraries. Consequently, it also cannot be used with production application code because most production code is stripped.

Other tools or utilities that may be used with production application code do not provide useful or meaningful performance analysis data. The ps utility, provided with many versions of the UNIX operating system, tracks and reports to a user the total amount of CPU used per process. It does not, however, tell a user where in the application the CPU cycles are being expended. The ps utility simply does not provide enough meaningful information to allow an application developer to determine the bottlenecks in the application.

Another utility provided with many versions of the UNIX operating system is pstack. It is a point-in-time utility that tells a user the calling stack of any given process. Using pstack and ps together may falsely identify bottlenecks. The shortcomings of the pstack and ps utilities may be demonstrated using the following sample application.

```
int tx1( )
{
    int i=0;
    char tx[100];
    for(i=0;i<10000;i++) {
        for(int j=0;j<100;j++)
            sprintf(tx,"%ld",j);
        i++;
    }
    return(0);
}
int tx2( )
{
    sleep(5);
    return(0);
}
main( )
{
    while(1) {
        tx1( );
        tx2( );
    }
}
```

When applied to the sample application code, pstack produces the following output.

/usr/proc/bin/pstack 2054

2054: doit ef638b5c sigsuspend (efffd7f8)

ef638b5c _libc_sigsuspend (efffd7f8, e, efffd808, ef6a571c, ef6a2e54, ef64dca8) +4 ef64dce4 _libc_sleep (5, 0, 0, 0, ef6a2e54, 10d7c)+f0

00010d7c _0FDtx2v (0, ef6a8c04, ef7571e0, 2, ef6a2e54, ef618ca8)+c

00010c5c main (1, efffd99c, efffd9a4, 21000, 0, 0)+c

00010c24 _start (0, 0, 0, 0, 0, 0)+dc

If pstack is run continuously on the sample application, most of the time it would show the application as spending most of its time in the sleep system call. The application developer would then incorrectly accredit most of the CPU cycles to the sleep system call rather than another part of the application.

If the application developer could continuously (and quickly) perform the ps command and the pstack command and correlate the results, he or she might obtain some useful performance data. However, the largest problem in obtaining useful data is speed. If the developer cannot perform these commands fast enough, the results would be suspect. The developer would need to perform at least 100 of these per second (10 ms gap). The inability to obtain meaningful and useful performance data on production application code makes it difficult, if not impossible, to tune or optimize production application code. Therefore, there is a need for a performance monitoring utility that may be used on production code and that provides meaningful and useful performance data.

SUMMARY OF THE INVENTION

The present invention—jTrace—addresses the shortcomings of the prior art performance monitoring tools and utilities. The present invention is a performance monitoring tool that can be used, without any preparation work, to actively measure an application. It provides accurate data to determine application code bottlenecks. The information regarding the code bottlenecks may then be used by an application developer to modify the code to reduce or eliminate bottlenecks. Unlike many prior art tools and utilities, it may be used on both stripped and non-stripped executables and run-time libraries.

The present invention calls a custom function that returns the calling stack and a custom function to determine CPU information. These functions execute in a loop over and over again and the results are maintained in a binary tree. Information from the binary tree is then used to obtain periodic snapshots of the executing code that may be viewed by an application developer to determine the code bottlenecks. After determining the code bottlenecks, the application developer can modify the code to reduce or eliminate the bottlenecks.

BRIEF DESCRIPTION OF THE DRAWING(S)

Figure 2:
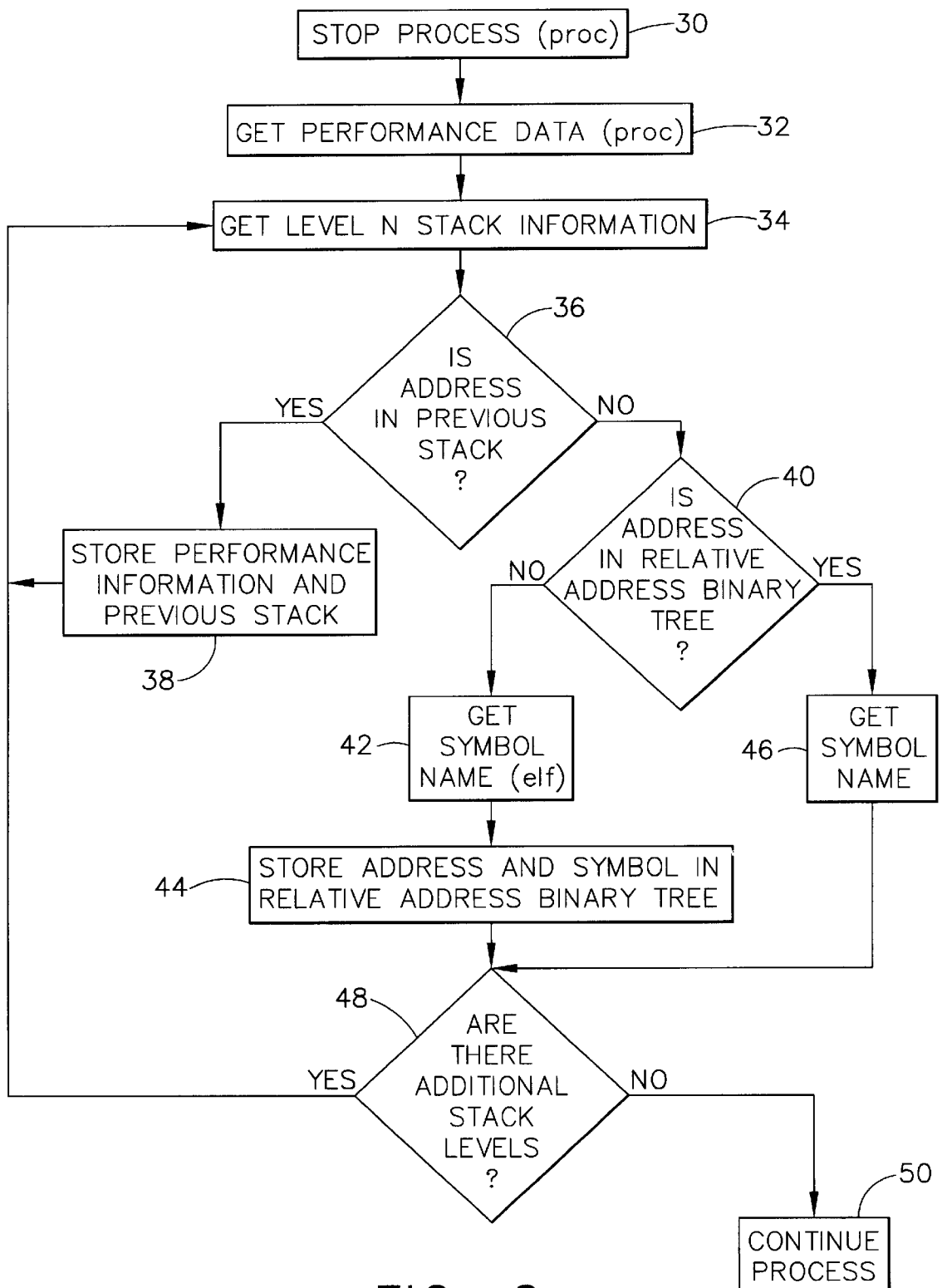

FIG. 1 is a depiction of a Stack Information Binary Tree in accordance with a preferred embodiment of the present invention; and FIG. 2 is a flowchart of the primary steps of the present invention in accordance with a preferred embodiment of the present invention.

DETAILED DESCRIPTION OF THE PREFERRED EMBODIMENT(S)

In a preferred embodiment of the present invention, a report comprising performance data for a process is generated so that performance bottlenecks in an application may be determined. Performance data may comprise several data points for each system and user function in the application. For example, performance data may comprise the number of function hits for each function in the application, system time, user time, and wall clock time. Other performance data may include cumulative times, average times, and other data related to a specific function in an application.

Referring to the following sample application, the functionality and features of the present invention may be explained.

```
int tx1( )
{
  int i=0;
  char tx[100];
  for(i=0;i<10000;i++) {
    for(int j=0;j<100;j++)
      sprintf(tx,"%ld",j);
    i++;
  }
  return(0);
}
int tx2( )
{
  sleep(5);
  return(0);
}
main( )
{
  while(1) {
    tx1( );
    tx2( );
  }
}
```

The following exemplary report shows the output of the present invention for the sample application. The Hits column shows how many times the particular function appeared during the scan. (It is not the number of times the function was called.) If a process is in a long sleep, the Hits may be high for that function. The Sys, User, and Clock columns show the user time, system time and wall clock time, respectively. The following report shows (correctly) the CPU cycles being expended in tx1 (98%) and not tx2 (sleep). It also shows that the wall clock elapsed time is correctly spent in sleep. So, sleep takes wall clock time, but very little CPU time.

|  | Hits | Sys\|% | User\|% | Clock | SBrk |
|---|---|---|---|---|---|
| 1_start | 993 | 0.03\|100 | 1.06\|100 | 9.86 | 0 |
| 2 main | 993 | 0.03\|100 | 1.06\|100 | 9.86 | 0 |
| 3 tx1 | 107 | 0.00\|0 | 1.04\|98 | 1.05 | 0 |
| 4 sprintf | 102 | 0.00\|0 | 0.99\|93 | 1.00 | 0 |
| 5_doprnt | 100 | 0.00\|0 | 0.97\|91 | 0.98 | 0 |
| 6_doprnt | 91 | 0.00\|0 | 0.88\|83 | 0.89 | 0 |
| 6 ferror | 3 | 0.00\|0 | 0.03\|2 | 0.03 | 0 |
| 6 sprintf | 2 | 0.00\|0 | 0.02\|1 | 0.02 | 0 |
| 5 sprintf | 2 | 0.00\|0 | 0.02\|1 | 0.02 | 0 |
| 3 tx2 | 885 | 0.03\|100 | 0.01\| 0 | 8.81 | 0 |
| 4 sleep | 885 | 0.03\|100 | 0.01\| 0 | 8.81 | 0 |
| 5_sigsuspend | 885 | 0.03\|100 | 0.01\| 0 | 8.81 | 0 |

In a preferred embodiment, the present invention may be constructed using the UNIX proc and elf functions. Proc functions are used to control the process (e.g. start, stop, obtain performance information, etc.) Elf (Executable and Linking Format) functions are used to get stack information. These functions may be used in custom functions that return calling stack information and performance data used by the present invention. It is understood that other tools and utilities, depending on the hardware and operating system implementation, may be used because they provide similar features, functions, and/or output.

Data stores are used to cache and store the data collected to analyze the performance of the application. Preferably, binary trees are used to store data because the access time is on the order of O(log n). However, many other types of data stores or structures (e.g., lists, stacks, etc.) may be used to produce the features and functionality of the present invention. Any type of data store in which data may be entered and retrieved may be used.

Relative addresses are stored in a Relative Addresses Binary Tree. Once an address is found on the stack, the relative address binary tree is used to determine the symbol name. The elf functions are used to initially find the symbols, but the speed of elf is very slow and requires several I/Os. Therefore, the addresses and symbols are cached in a binary tree for quick retrieval. The basic structure of this tree is:

```
struct tree {
  void * address;
  char SymbolName[X];
  struct tree *left;
  struct tree *right;
}
```

A normal binary tree can not be used to store all possible stacks within an application. Therefore, stack information is stored as a Stack Information Binary Tree which is a binary tree of binary trees. In addition to the normal left and right pointers, a children pointer points to the children functions called.

```
struct node {
  void *address;
```

```
char SymbolName[X];
struct PerformanceData;
struct node *peer_left;
struct node *peer_right;
struct node *children;
}
```

Referring to FIG. 1, the Stack Information Binary Tree for the sample application is shown. As shown in FIG. 1, each symbol is stored in its own node which has a left, right, and child pointer. As shown in FIG. 1, the symbol _start is at node 10, _main is at node 12, _tx1 is at node 14, _tx2 is at node 16, _sprintf is at node 18, and _sleep is at node 20. Also, as shown in FIG. 1, _main 12 is a child function of _start 10 as the children pointer of _start 10 points to _main 12. The function _tx2 16 is a child function of _main 12 as the children pointer of _main 12 points to _tx2 16. Also as indicated in FIG. 1, tx1 14 is a sibling function of tx2 16 as indicated by the peer _left pointer of _tx2.

Another data store, the Previous Stack Array, is an array of Stack Information pointers. For the previous stack, it contains pointers into the Stack Information Binary Tree. Because the present invention works very quickly, in many instances, the 'previous stack' looks quite similar to the current stack. In some scenarios, it is possible that all stacks contain the highest level SymbolName. This stack may be used to further speed up the Relative Address and Stack Information.

Referring to FIG. 2, a flowchart of the primary steps of the present invention is shown. In the first step 30, the process for which performance data is to be collected is stopped using a proc function. In the next step 32, performance data for the stopped process is collected also using a proc function. In the next steps, the stack information for the stopped process is examined to build the data stores (preferably, binary trees) used by the present invention. For each level in the process, stack information is determined and stored in the appropriate binary tree. In step 34, the stack information for the current level is obtained. Next, in step 36, a check is made to determine whether the current address is in the previous stack data store. If it is, the next step that is executed is 38, and the performance information and previous stack information is stored. If the current address is not in the previous stack, then in step 40, another check is made to determine if the current address is in the Relative Address Binary Tree. If it is, the next step that is executed is 46, and the symbol name for the current address is retrieved from the Relative Address Binary Tree. If the current address is not in the Relative Address Binary Tree, elf functions are used to get the symbol name as shown in step 42. Next, in step 44, the address and symbol information is stored in the Relative Address Binary Tree. In step 48, a check is made to determine whether there are additional stack levels to be examined. If there are additional stack levels to be examined, the process repeats starting at step 34. If there are no additional stack levels to be examined, the process that was stopped at step 30 continues execution at step 50. The process may be stopped and started repeatedly to get performance data over time.

In a preferred embodiment, an application developer may use the performance monitoring tool of the present invention as follows:

jTrace -p<PID>[-l#] [-t#] [-s#] [-p#] [-eString] [-aString]

where the options are:

| | | |
|---|---|---|
| -pn | REQUIRED | PID to Trace |
| -ln | OPTIONAL | This options controls the number of levels to print. |
| -tn | OPTIONAL | This options controls how often (seconds) to print out information. |
| -sn | OPTIONAL | Number of seconds between scans. |
| -fn | OPTIONAL | Filter out percentage. Exclude lower 1%. |
| -e"S" | OPTIONAL | Function to exclude. This option may be used to filter out the normal 'wait state' of the process. |
| -a"S" | OPTIONAL | Function to always print. |

The defaults for jTrace, preferably, are as follows:

| | |
|---|---|
| -l | Print top 20 Levels |
| -t | Print every 60 seconds |
| -s | Zero seconds between scans |
| -f | Filter out lower 1% |

In a preferred embodiment of the present invention, jTrace may be used to obtain and report additional data or information as follows. Average Snapshot data informs the user how rapidly jTrace is performing by telling the number of stacks retrieved per second. A Function Stack portion of a report shows function time as it relates to the full calling path. If the same function is called by two different parents, multiple lines may be shown. A Function Summary portion of a report shows summary information per function regardless of the parent of a process. A Cumulative column in a report show times for both the current function and its descendants. A Singular column in a report shows just the current function, but no descendants. A SBrk column in a report shows the sbrk value which may indicate a memory leak. Other data and information may be reported as well depending on the utilities used to obtain the data.

The present invention—jTrace—may be used by an application developer to monitor and evaluate the performance of an application. The invention may be used on executable code, stripped or non-stripped, without any preparation on the part of the application developer. Therefore, the present invention may be used on production code as well as code that is under development. The present invention provides important and accurate data that an application developer may use to tune application code. In view of the present disclosure, it will be within the ability of one of ordinary skill to make and use the present invention through modifications to the invention disclosed herein, such as through the integration or substitution of system components, without departing from the spirit of the invention as reflected in the appended claims.

What is claimed is:

1. A method for performance monitoring of application code, comprising the steps of:
   (a) initializing a relative address data store;
   (b) initializing a stack information data store;
   (c) initializing a previous stack information data store;
   (d) stopping a process;
   (e) obtaining performance data for said process;
   (f) obtaining current level stack information for said process;
   (g) determining whether an address from said current level stack information is in said previous stack information data store;
   (h) storing said performance data and said address in said previous stack information data store if said address from said current level stack information is in said previous stack information data store;
   (i) determining whether said address from said current level stack information is in said relative address data store;

(j) obtaining a symbol name from said relative data store if said address is in said relative address data store;

(k) obtaining a symbol name and storing said address and said symbol name in said relative address data store if said address is not in said relative data store;

(l) repeating steps (f)–(k) if there are additional stack levels for said process;

(m) continuing said process when there are no additional stack levels; and (n) generating a report comprising said performance data for said process.

2. The method of claim 1 wherein said previous stack information data store is an array.

3. The method of claim 1 wherein said stack information data store is a binary tree.

4. The method of claim 1 wherein said relative address data store is a binary tree.

5. The method of claim 1 wherein steps (a) and (m) are performed using a proc function.

6. The method of claim 1 wherein step (k) is performed using an elf function.

7. The method of claim 1 wherein said performance data comprises hits, system time, user time, wall clock time, average snapshot data, function stack data, function summary data, cumulative data, singular data, and sbrk data.

8. The method of claim 1 wherein said process is represented by a stripped executable.

9. The method of claim 1 wherein said process is represented by a non-stripped executable.

10. The method of claim 1 further comprising the step of repeating steps (d)–(m).

11. A system for performance monitoring of application code comprising:

a process comprising a plurality of functions;

a relative address data store for storing relative addresses and symbol names for each of said functions in said process;

a stack information data store for storing addresses, symbol names, and performance data for each of said functions in said process;

a previous stack information data store for storing pointers to said stack information data store; and a report comprising said performance data for each of said functions in said process, said report generated in accordance with said stack information data store.

12. The system of claim 11 wherein said previous stack information data store is an array.

13. The system of claim 11 wherein said stack information data store is a binary tree.

14. The system of claim 11 wherein said relative address data store is a binary tree.

15. The system of claim 11 wherein said performance data comprises hits, system time, user time, wall clock time, average snapshot data, function stack data, function summary data, cumulative data, singular data, and sbrk data.

16. The system of claim 11 wherein said process is represented by a stripped executable.

17. The system of claim 11 wherein said process is represented by a non-stripped executable.

18. A method for performance monitoring of application code, comprising the steps of:

(a) obtaining calling stack information for a process comprising a plurality of functions;

(b) obtaining performance data for each of said functions of said process;

(c) storing in a first data store calling stack information and performance data for each of said functions of said process;

(d) storing in a second data store pointers to said calling stack information; and (e) generating a report comprising said performance data for each of said functions of said process, said report generated in accordance with said first data store and said second data store.

19. The method of claim 18 wherein said process is represented by an executable selected from the group consisting of stripped executables and non-stripped executables.

20. The method of claim 18 wherein said performance data comprises hits, system time, user time, wall clock time, average snapshot data, function stack data, function summary data, cumulative data, singular data, and sbrk data.

* * * * *